(12) United States Patent
Nugent et al.

(10) Patent No.: US 6,871,816 B2
(45) Date of Patent: Mar. 29, 2005

(54) PROACTIVE OPTICAL TRAJECTORY FOLLOWING SYSTEM

(75) Inventors: Mark R. Nugent, Torrance, CA (US); John Richard Selmon, Redondo Beach, CA (US)

(73) Assignee: The Boeing Company, Chicago, IL (US)

(*) Notice: Subject to any disclaimer, the term of this patent is extended or adjusted under 35 U.S.C. 154(b) by 54 days.

(21) Appl. No.: 10/633,346

(22) Filed: Jul. 31, 2003

(65) Prior Publication Data

US 2005/0045761 A1 Mar. 3, 2005

(51) Int. Cl.[7] .............................. G01J 1/42; F41G 7/26
(52) U.S. Cl. .................... 244/3.16; 244/3.15; 356/342; 250/372
(58) Field of Search .............................. 244/3.15, 3.16, 244/3.17, 194, 195; 356/342, 436; 250/372, 373

(56) References Cited

U.S. PATENT DOCUMENTS

| | | | | |
|---|---|---|---|---|
| 3,856,402 A | * | 12/1974 | Low et al. | 356/5.06 |
| 4,266,130 A | * | 5/1981 | Kuhn | 250/339.14 |
| 4,342,912 A | * | 8/1982 | Adamson | 250/339.14 |
| 4,359,640 A | * | 11/1982 | Geiger | 250/372 |
| 4,427,306 A | * | 1/1984 | Adamson | 374/128 |
| 5,272,513 A | | 12/1993 | Vahala et al. | |
| 6,343,766 B1 | * | 2/2002 | Livingston | 244/3.13 |

* cited by examiner

Primary Examiner—Teri Pham Luu
Assistant Examiner—Stephen A. Holzen
(74) Attorney, Agent, or Firm—Robert R. Richardson (57) ABSTRACT

A system for automatically correcting flight path of an aircraft onto a predetermined trajectory is provided. A sensor is configured to sense speed and direction of air relative to the aircraft at a predetermined distance in front of the aircraft. A navigation system is configured to determine displacement of a flight path of the aircraft from a predetermined trajectory. A processor is coupled to receive the sensed speed and direction of air from the sensor and the displacement of the flight path from the navigation system. The processor includes a first component that is configured to determine whether the speed of the air at the predetermined distance is indicative of turbulence, and a second component that is configured to automatically generate control signals to correct the flight path of the aircraft from the displacement onto the predetermined trajectory by a time when the aircraft enters the turbulence.

62 Claims, 5 Drawing Sheets

PROACTIVE OPTICAL TRAJECTORY FOLLOWING SYSTEM

RELATED APPLICATION

This patent application is related to a concurrently filed patent application entitled "PROACTIVE OPTICAL WIND SHEER PROTECTION AND RIDE QUALITY IMPROVEMENT SYSTEM", the contents of which are hereby incorporated by reference.

FIELD OF THE INVENTION

The present invention relates generally to avionics and, more specifically, to flight control avionics.

BACKGROUND OF THE INVENTION

Various types of aircraft follow a predetermined trajectory during flight for a variety of reasons. For example, a missile follows a predetermined trajectory to reduce errors in the missile's point of impact. In this example, improving impact error results in a performance improvement for the missile and a safety improvement by possibly reducing any unintended collateral damage that may result from an erroneous impact point.

Other aircraft also follow predetermined trajectories. For example, unmanned air vehicles, such as drones, follow predetermined trajectories to a point of interest where operations, such as reconnaissance operations, may be conducted. In this case, the aircraft follows the predetermined trajectory to reduce errors in reconnaissance or surveillance data gathered by the aircraft as well as improve aircraft performance.

In this context, variations in speed of the air relative to an aircraft can cause development of conditions of varying severity. For example, aircraft frequently encounter turbulence during flight. When an aircraft that is followings a trajectory enters turbulence, the turbulence can displace the flight path of the aircraft from the predetermined trajectory. Current sensing systems for velocity of air relative to an aircraft cannot look ahead of the aircraft. Current sensors include pitot tubes and, therefore, are reactive to pressure of air in which the airplane is flying. As a result, when an aircraft that is following a predetermined trajectory encounters turbulence and its flight path is displaced from the predetermined trajectory that it is following, any correction for displacement from the trajectory is reactive. Therefore, a potential is created for operational errors and sub-optimal aircraft performance.

It would be desirable to proactively correct for turbulence in an aircraft that is following a predetermined trajectory. However, there is an unmet need in the art for a system that proactively corrects for turbulence in an aircraft that is following a trajectory.

SUMMARY OF THE INVENTION

Embodiments of the present invention provide systems and methods for proactively correcting flight path of an aircraft onto a predetermined trajectory. By detecting and proactively responding to turbulence, the present invention automatically corrects the flight path of the aircraft onto the predetermined trajectory as the aircraft encounters the turbulence. By proactively correcting the flight path for turbulence as the aircraft enters the turbulence instead of reacting to the turbulence after a trajectory error has been generated, the present invention mitigates effects of trajectory errors on operation of the aircraft as well as increases flight performance of the aircraft.

Embodiments of the present invention automatically correct flight path of an aircraft onto a predetermined trajectory. A sensor is configured to sense speed of air relative to the aircraft at a predetermined distance in front of the aircraft. A navigation system is configured to determine displacement of a flight path of the aircraft from the predetermined trajectory. A processor is coupled to receive the sensed speed of air from the sensor and the displacement of the flight path from the navigation system. The processor includes a first component that is configured to determine whether the speed of the air at the predetermined distance is indicative of turbulence, and a second component that is configured to automatically generate control signals to correct the flight path of the aircraft from the displacement onto the predetermined trajectory by a time when the aircraft enters the turbulence.

According to an aspect of the invention, the airspeed is sensed by an optical sensor, such as a laser.

According to another aspect, the speed of the air is sensed for turbulence at a relatively short distance in front of the aircraft, such as without limitation, a distance on the order of around 100 feet.

BRIEF DESCRIPTION OF THE DRAWINGS

The preferred and alternative embodiments of the present invention are described in detail below with reference to the following drawings.

DETAILED DESCRIPTION OF THE INVENTION

By way of overview, embodiments of the present invention automatically correct flight path of an aircraft onto a predetermined trajectory. A sensor is configured to sense speed of air relative to the aircraft at a predetermined distance in front of the aircraft. A navigation system is configured to determine displacement of a flight path of the aircraft from the predetermined trajectory. A processor is coupled to receive the sensed speed of air from the sensor and the displacement of the flight path from the navigation system. The processor includes a first component that is configured to determine whether the speed of the air at the predetermined distance is indicative of turbulence, and a second component that is configured to automatically generate control signals to correct the flight path of the aircraft from the displacement onto the predetermined trajectory by a time when the aircraft enters the turbulence.

Figure 1A:
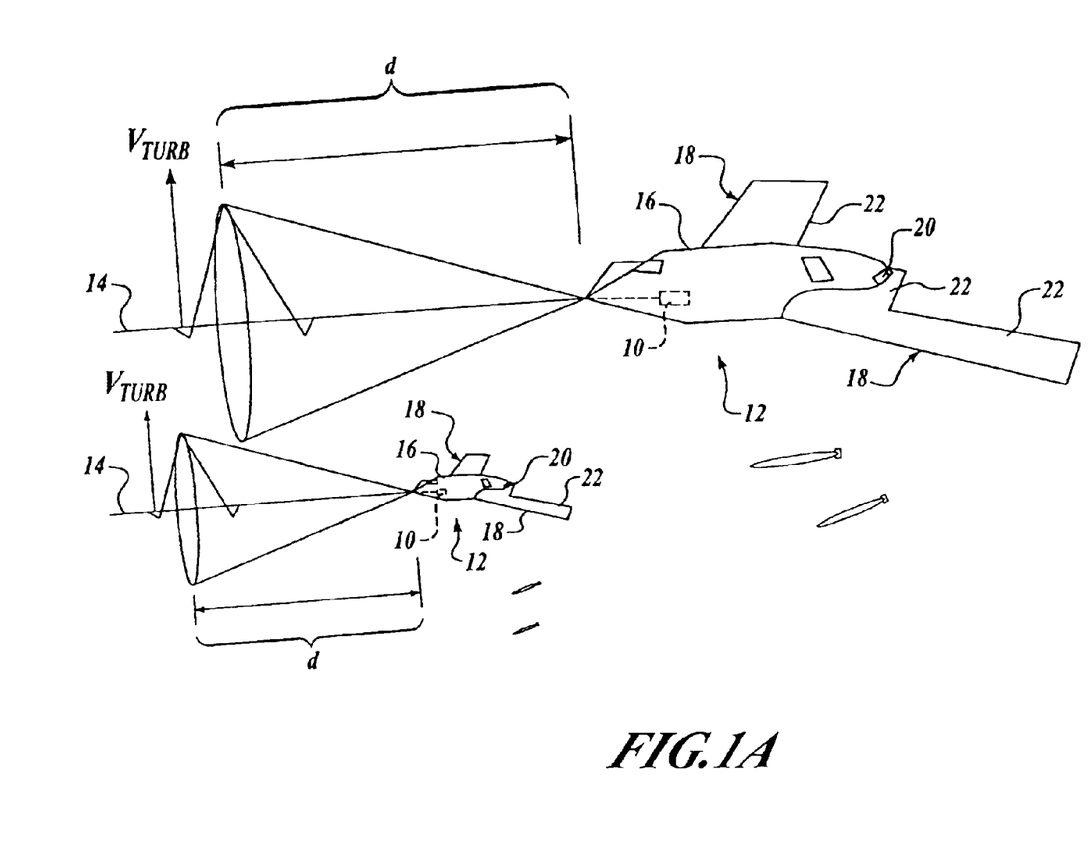
FIG. 1A is a side view of an in-flight aircraft sensing speed of the air according to one embodiment of the present invention.

Referring now to FIG. 1A, an exemplary system 10 according to an embodiment of the present invention enables aircraft 12 to automatically correct flight path of the aircraft 12 onto a predetermined trajectory 14 by compensating for turbulence, thereby increasing operational accuracy of the aircraft 12 and improving flight performance of the aircraft 12. The sensor (not shown) senses speed and direction of air relative to the aircraft 12 at a distance d in front of the aircraft 12. In this exemplary system 10, the distance d is suitably a relatively short distance in front of the aircraft 12. For, example, the distance d may be less then 1,000 meters. In one embodiment, the distance d is around 100 feet. However, it will be appreciated that any distance d may be selected as desired for a particular application. As is known, the speed of the air is an air mass velocity that is a vector quantity. The speed of the air is a vector velocity that includes a component $V_u$ along the X direction, a component $V_v$ along the Y direction, and a component $V_w$ along the Z direction. For sake of clarity, the component $V_W$ is the only component shown in FIG. 1A (and in all other FIGURES, as well) and is labeled as $V_{turb}$.

As will be explained in detail below, the system 10 generates control signals that cause control of the aircraft 12 to be compensated for detected turbulence to correct the flight path onto the trajectory 14 when the aircraft 12 enters the detected turbulence. As shown in FIG. 1A, more than one of the aircraft 12 suitably may be flying in formation by following its own predetermined trajectory 14. As is known, the aircraft 12 includes a fuselage 16, a pair of wings 18, and at least one engine 20. As is also known, the aircraft 12 includes control surfaces 22. Given by way of nonlimiting example, the aircraft 12 includes an unmanned air vehicle, such as the X-45 Unmanned Combat Air Vehicle manufactured by The Boeing Company. The control surfaces in the exemplary aircraft 12 shown in FIG., 1A include ailerons and elevons for controlling roll, pitch, and yaw. However, it will be appreciated that other types of aircraft 12 may include the system 10, and that the control surfaces 22 may be provided depending on the type of the aircraft 12. For example, the aircraft 12 may include without limitation other types of manned or unmanned air vehicles, such as drones or the like, that may include control surfaces 22 such as ailerons, elevators, and a rudder for controlling roll, pitch, and yaw, respectively.

Figure 1B:
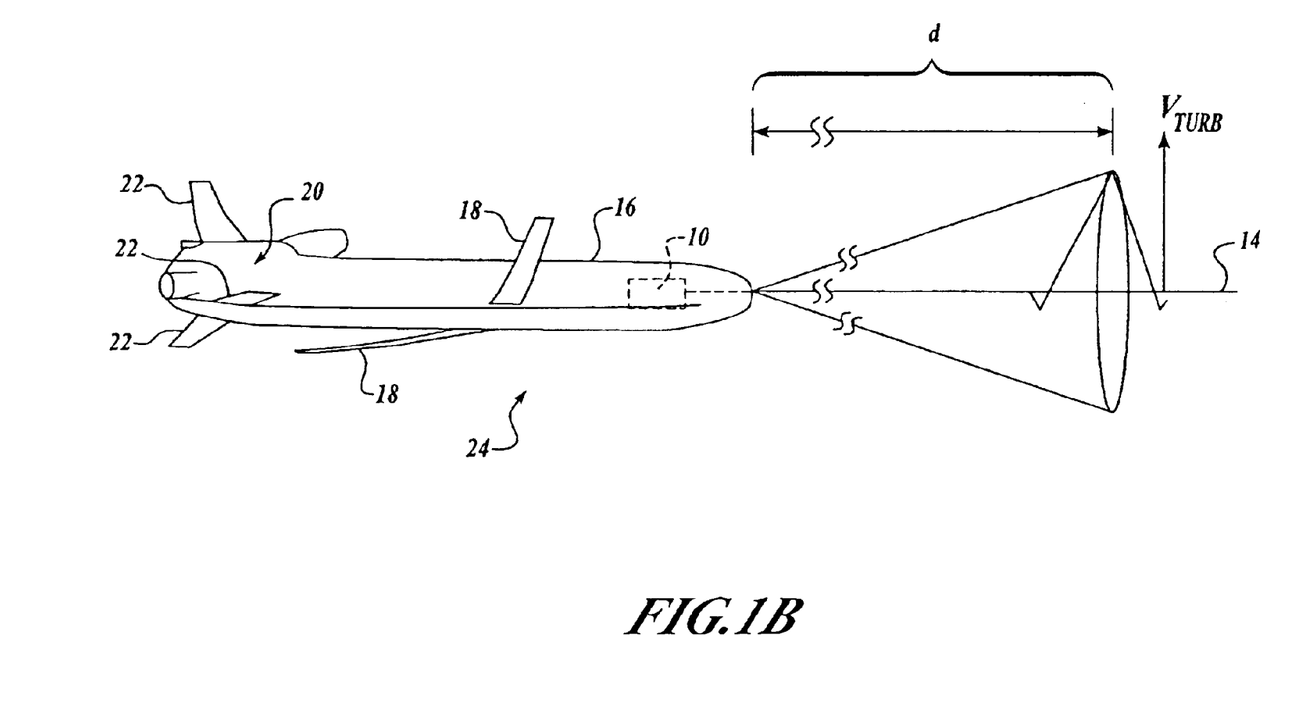
FIG. 1B is a side view of an in-flight missile sensing speed of the air according to an embodiment of the present invention.

Other types of vehicles may include the system 10 as desired. Referring now to FIG. 1B, a missile 24 includes the system 10 for automatically correcting flight path onto the trajectory 14 when turbulence detected at the distance d is entered. The missile 24 may be any type of missile, such as without limitation a Conventional Air Launched Cruise Missile manufactured by The Boeing Company. As is known, the missile 24 includes a fuselage 16, an engine 20 such as a turbojet engine, and control surfaces 22 such as fins. In the nonlimiting example shown in FIG. 1B, a pair of wings 18 is optionally provided.

Figure 1C:
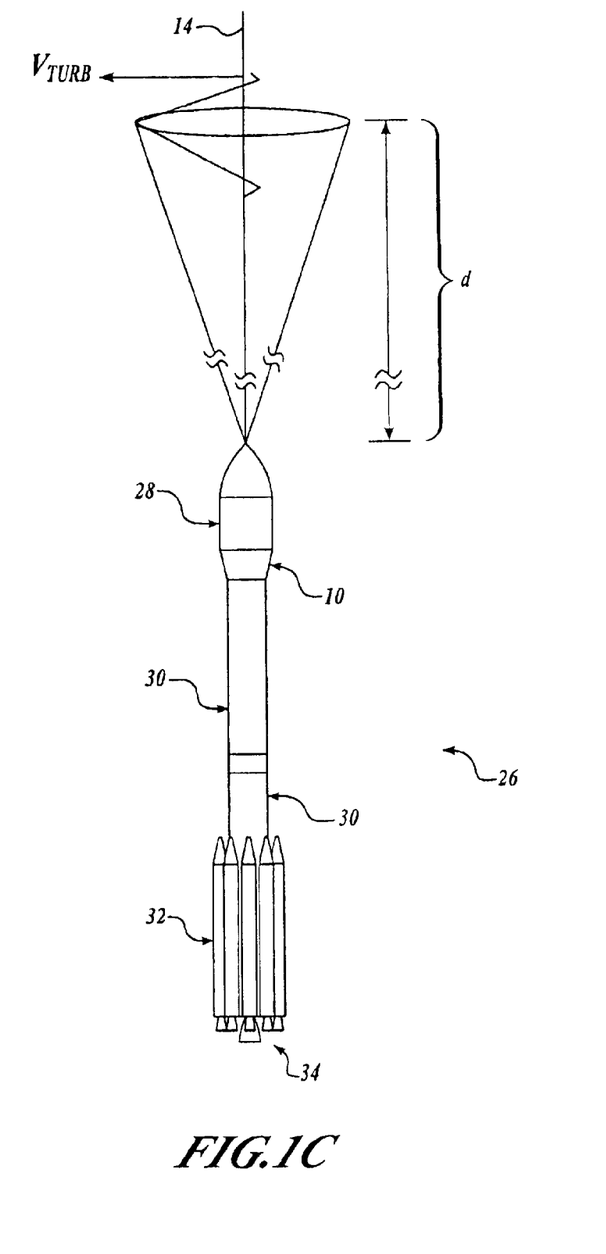
FIG. 1C is a side view of a launch vehicle sensing speed of the air according to an embodiment of the present invention.

Referring now to FIG. 1C, given by way of another nonlimiting example, a rocket 26, such as without limitation a launch vehicle like a Delta 11 launch vehicle manufactured by The Boeing Company, includes the system 10 for correcting flight path of the rocket 26 onto the trajectory 14 when turbulence detected at the distance d is entered. It will be appreciated that correcting the flight path of the rocket 26 for turbulence is applicable up to altitudes of around 100,000 feet or less. As a result, the system 10 corrects the flight path for turbulence during the ascent phase of the flight profile of the rocket 26. As is known, the rocket 26 includes a payload faring 28, fuel tanks 30, strap-on motors 32, and a main engine 34. However, it will be appreciated that any type of rocket may include the system 10 as desired.

Figure 2:
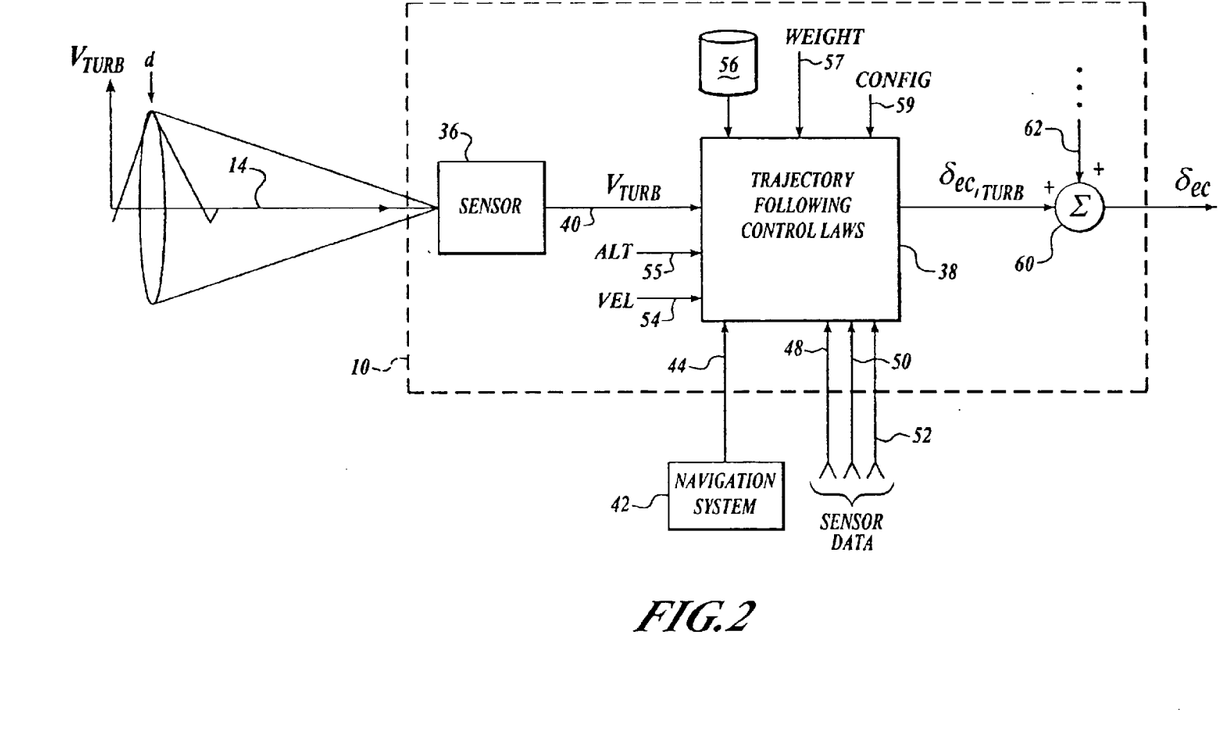
FIG. 2 is a block diagram of a system of an embodiment of the present invention.

Referring now to FIG. 2, a sensor 36 senses the speed and direction of the air relative to the air vehicle, such as the aircraft 12 (FIG. 1A), the missile 24 (FIG. 1B), the rocket 26 (FIG. 1C), or the like, at the distance d in front of the air vehicle. The sensor 36 is suitably any sensing system that is configured to sense speed and direction of the air in front of an air vehicle. In one presently preferred embodiment, the sensor 36 is an optical sensor, such as a laser-based optical air data sensor. An exemplary optical air data sensor that is well-suited for the sensor 26 is a laser Doppler velocimeter available from Optical Air Data Systems, L. P. The laser Doppler velocimeter is described in U.S. Pat. No. 5,272,513, the contents of which are hereby incorporated by reference. Advantageously, the sensor 36 provides a capability to "look ahead" of the air vehicle that permits turbulence to be detected in front of the air vehicle at the distance d. This look-ahead capability permits the system 10 to proactively compensate for turbulence in correcting the flight path of the air vehicle onto the desired trajectory 14 by a time when the air vehicle enters the turbulence.

Trajectory following control laws 38 receives from the sensor 36 a signal 40 that is indicative of the speed of the air relative to the air vehicle at the distance d in front of the air vehicle. The trajectory following control laws 38 also receive a signal 54 that is indicative of velocity of the air vehicle. The trajectory following control laws 38 are implemented within a flight control laws processor. The flight control laws processor is suitably any acceptable flight management computer or the like that is configured to perform calculations and process signals indicative of various flight-related parameters. Flight management computers are well known in the art, and a detailed description of its construction and operation is not necessary for an understanding of the invention.

The trajectory following control laws 38 receives from a navigation system 42 a set of signals 44 that provide information regarding the actual flight path, and positions, attitudes and their rates, of the air vehicle. Navigation systems that generate signals representing the flight path, and positions, attitudes and their rates, of the air vehicle are well known. As a result, an explanation of details of construction and operation of the navigation system 42 is not necessary for an understanding of the present invention.

The trajectory following control laws 38 receives from known sensors (not shown) signals 48, 50, and 52 that are indicative of roll rate, pitch rate, and yaw rate, respectively. A signal 54 that is indicative of velocity of the air vehicle and a signal 55 that is indicative of altitude of the air vehicle are also supplied to the trajectory following control laws 38 from known sensors. If desired, signals 57 and 59 that are indicative of weight of the air vehicle and configuration of the air vehicle, respectively, may be provided to the trajectory following control laws 38. The trajectory following control laws 38 suitably are implemented in any acceptable flight control computer or the like that is configured to perform calculations and process signals indicative of various flight-related parameters. Flight control computers are well known in the art, and a detailed description of its construction and operation is not necessary for an understanding of the invention.

The trajectory following control laws 38 generates turbulence deflection commands $\delta_{ec,\ turb}$, which are to be inserted into the existing flight control laws of the vehicle. As is known, a set of flight control laws for the air vehicle is stored in storage 56, such as a memory device, a magnetic or optical disk, a CD-ROM, or the like. The flight control computer retrieves the set of flight control laws from storage 56 and applies position error to the flight control laws. In addition, the flight control laws 38 applies pitch rate, roll rate, and yaw rate (from the signals 48, 50, and 52, respectively) to the control laws. Applying the signals 44, 48, 50, and 52 to the control laws results in a known correction of flight path of an air vehicle that is displaced from a trajectory back onto the trajectory.

It will be appreciated that the known portion of correction of the flight path based on the signals 44, 48, 50, and 52 as described above takes into account position error. Advantageously, according to the present invention, the system 10 also proactively includes effects of turbulence into correction of the flight path back onto the trajectory. The trajectory following control laws 38 retrieves the set of control laws from storage 56 and applies the signal 40 that is indicative of the speed of the air relative to the air vehicle to the control laws for the air vehicle.

Advantageously, the trajectory following control laws 38 takes into account the velocity of the air vehicle via the signal 54. As a result, the turbulence deflection commands $\delta_{ec, turb}$ are output by the trajectory following control laws 38 at a time such that the control surfaces of the air vehicle have already been positioned to compensate for the sensed turbulence according to the control laws for the air vehicle by the time the air vehicle travels the distance d at the velocity at which the air vehicle is traveling.

The trajectory following control laws 38 applies the signals 44, 48, 50, 52, 40, 54, 55, 57, and 59 as described above to generate the turbulence deflection commands $\delta_{ec, turb}$ to correct flight path of the air vehicle from a displacement back onto the trajectory 14. Advantageously, the turbulence deflection commands $\delta_{ec, turb}$ are output at a time such that the control surfaces of the air vehicle are positioned to compensate for the sensed turbulence according to the control laws for the air vehicle by the time the air vehicle travels the distance d at the velocity indicated by the signal 54. As a result, correction of the flight path of the air vehicle back onto the trajectory 14 advantageously is compensated for detected turbulence by the time the air vehicle travels the distance d and enters the detected turbulence. Because the control surfaces of the air vehicle are already positioned to compensate for detected turbulence when the air vehicle enters the detected turbulence, any effects of the turbulence advantageously are mitigated by proactive position of the control surfaces as described above.

The turbulence deflection commands $\delta_{ec, turb}$ are added to the surface commands within the flight control laws. The flight control laws generates control surface deflection commands $\delta_{ec}$ in any acceptable known manner. The flight control laws includes a summer 60. The turbulence deflection commands $\delta_{ec, turb}$ are supplied to one input of the summer 60. Signals 62 are provided from the flight control laws for the control surfaces 22 (FIGS. 1A, 1B and 1C) to another input of the summer 60.

The following nonlimiting example of operation of the system 10 is provided for illustrative purposes only. In one nonlimiting example, an air vehicle is traveling at a velocity and is below its trajectory 14. At the distance d in front of the air vehicle, $V_{turb}$ is detected with a positive component that tends to exert an upward force on the air vehicle. The flight control laws processor 38 retrieves and applies the signals 44, 48, 50, and 52 that are indicative of position error, roll rate, pitch rate, and yaw rate, respectively, to the control laws for the air vehicle. The trajectory following control laws 38 also applies the signals 40, 54, 55, 57, and 59 that are indicative of $V_{turb}$, air vehicle velocity, air vehicle altitude, air vehicle weight, and air vehicle configuration, respectively, to the control laws for the air vehicle. As a result, the surface deflection commands $\delta_{ec}$ cause the control surfaces 22 (FIGS. 1A, 1B, and 1C) to respond to the turbulence deflection commands $\delta_{ec, turb}$ to correct the flight path of the air vehicle upwardly onto the trajectory 14. Advantageously, at a time when the air vehicle enters the detected turbulence, the turbulence deflection commands $\delta_{ec, turb}$ cause the control surfaces 22 (FIGS. 1A, 1B, and 1C) to respond to the surface deflection commands $\delta_{ec}$ to compensate for the detected turbulence. It will be appreciated that correcting the flight path upwardly onto the trajectory 14 and simultaneously entering turbulence that exerts an upward force could cause the correction to overshoot the trajectory 14 if turbulence were not compensated. Advantageously, according to the present invention, compensating for the detected turbulence in this nonlimiting example prevents them air vehicle from overshooting above the trajectory 14.

Figure 3:
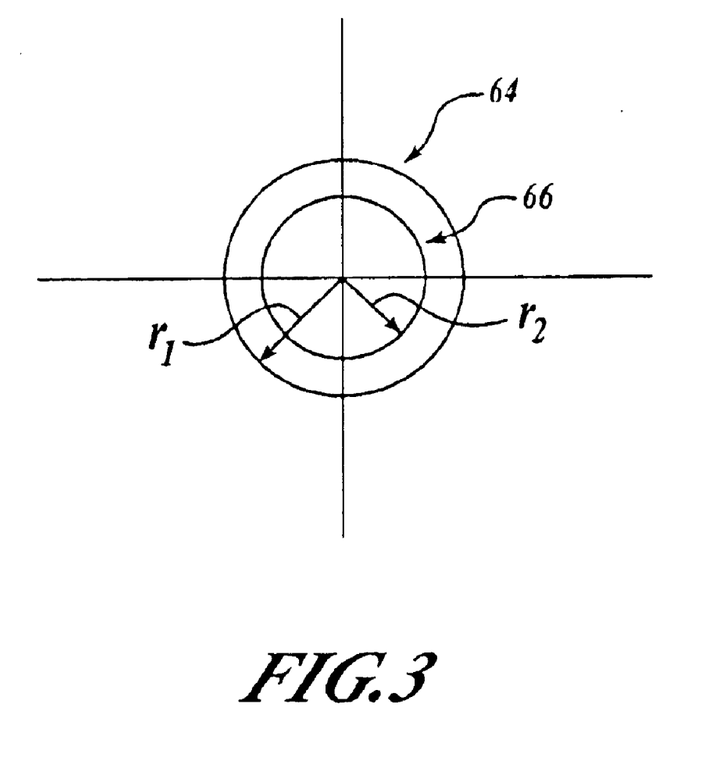
FIG. 3 is a graph of circle error probability.

Referring now to FIG. 3, it will be appreciated that the present invention advantageously reduces the circle of error probability, that is a measure of accuracy with which an air vehicle, such as a rocket or missile, can be guided. Without benefit of the system 10, turbulence can only be compensated reactively after the air vehicle is displaced from the trajectory being followed. This results in a circle of error probability 64 having a radius $r_1$ within which 50% of reliable shots land within a predetermined distance of the target. However, it will be appreciated that automatically and proactively compensating for turbulence when correcting flight path of an air vehicle onto its predetermined trajectory, as described above, results in a circle of error probability 66 having a radius $r_2$ that is smaller than the radius $r_1$. That is, proactively compensating for turbulence when correcting trajectory of an air vehicle increases operational accuracy of the air vehicle.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A system for automatically correcting flight path of an aircraft onto a predetermined trajectory, the system comprising:
   a sensor configured to sense speed of air relative to an aircraft at a predetermined distance in front of the aircraft;
   a navigation system configured to determine displacement of flight path of the aircraft from a predetermined trajectory; and
   a processor coupled to receive the sensed speed of air from the sensor and the displacement of the flight path from the navigation system, the processor including:
   a first component configured to determine whether the speed of the air at the predetermined distance is indicative of turbulence; and
   a second component configured to automatically generate control signals to correct the flight path of the aircraft from the displacement onto the predetermined trajectory by a time when the aircraft enters the turbulence.

2. The system of claim 1, wherein the second component automatically generates the control signals responsive to the indication of turbulence.

3. The system of claim 2, wherein the second component automatically generates the control signals further responsive to the displacement of the flight path.

4. The system of claim 3, wherein the displacement of the flight path includes a position error component.

5. The system of claim 1, wherein the sensor includes an optical sensor.

6. The system of claim 5, wherein the optical sensor includes a laser.

7. The system of claim 6, wherein the laser includes a laser Doppler velocimeter system.

8. The system of claim 1, wherein the predetermined distance is less than around 1,000 meters.

9. The system of claim 8, wherein the predetermined distance is around 100 feet.

10. The system of claim 1, wherein the aircraft includes an unmanned aircraft.

11. The system of claim 10, wherein the unmanned aircraft includes a rocket propelled vehicle.

12. The system of claim 11, wherein the rocket propelled vehicle includes a missile.

13. The system of claim 10, wherein the unmanned aircraft includes a drone.

14. A method for automatically correcting flight path of an aircraft onto a predetermined trajectory, the method comprising:
sensing speed of air relative to an aircraft at a predetermined distance in front of the aircraft;
determining whether the speed of the air at the predetermined distance is indicative of turbulence;
determining displacement of a flight path of the aircraft from a predetermined trajectory; and
automatically correcting the flight path of the aircraft from the displacement onto the predetermined trajectory by a time when the aircraft enters the turbulence.

15. The method of claim 14, wherein automatically correcting the light path includes automatically generating control signals.

16. The method of claim 15, wherein the control signals are generated responsive to the indication of turbulence.

17. The method of claim 16, wherein the control signals are further generated responsive to the displacement of the flight path.

18. The method of claim 17, wherein the displacement of the flight path includes a position error component.

19. The method of claim 14, wherein automatically correcting the flight path includes automatically positioning control surfaces.

20. The method of claim 14, wherein the speed of the air is sensed by an optical sensor.

21. The method of claim 20, wherein the optical sensor includes a laser.

22. The method of claim 21, wherein the laser includes a laser Doppler velocimeter system.

23. The method of claim 14, wherein the predetermined distance is less than around 1,000 meters.

24. The method of claim 23, wherein the predetermined distance is around 100 feet.

25. The method of claim 14, wherein the aircraft includes an unmanned aircraft.

26. The method of claim 25, wherein the unmanned aircraft includes a rocket propelled vehicle.

27. The method of claim 26, wherein the rocket propelled vehicle includes a missile.

28. The method of claim 25, wherein the unmanned aircraft includes a drone.

29. A system for automatically correcting flight path of an aircraft onto a predetermined trajectory, the system comprising:
an optical sensor configured to sense speed of air relative to an aircraft at a predetermined distance in front of the aircraft;
a navigation system configured to determine displacement of flight path of the aircraft from a predetermined trajectory; and
a processor coupled to receive the sensed speed of air from the sensor and the displacement of the flight path from the navigation system, the processor including:
a first component configured to determine whether the speed of the air at the predetermined distance is indicative of turbulence; and
a second component configured to automatically generate control signals responsive to the indication of turbulence and farther responsive to the displacement of the flight path to correct the flight path of the aircraft from the displacement onto the predetermined trajectory by a time when the aircraft enters the turbulence.

30. The system of claim 29, wherein the displacement of the flight path includes a position error component.

31. The system of claim 29, wherein the optical sensor includes a laser.

32. The system of claim 31, wherein the laser includes a laser Doppler velocimeter system.

33. The system of claim 29, wherein the predetermined distance is less than around 1,000 meters.

34. The system of claim 33, wherein the predetermined-distance is around 100 feet.

35. The system of claim 29, wherein the aircraft includes an unmanned aircraft.

36. The system of claim 35, wherein the unmanned aircraft includes a rocket propelled vehicle.

37. The system of claim 36, wherein the rocket propelled vehicle includes a missile.

38. The system of claim 35, wherein the unmanned aircraft includes a drone.

39. A method for automatically correcting flight path of an aircraft onto a predetermined trajectory, the method comprising:
optically sensing speed of air relative to an aircraft at a predetermined distance in front of the aircraft;
determining whether the speed of the air at the predetermined distance is indicative of turbulence;
determining displacement of a flight path of the aircraft from a predetermined trajectory; and
automatically generating control signals responsive to the indication of turbulence and further responsive to the displacement of the flight path to correct the flight path of the aircraft from the displacement onto the predetermined trajectory by a time when the aircraft enters the turbulence.

40. The method of claim 39, wherein the displacement of the flight path includes a position error component.

41. The method of claim 39, wherein the flight path is corrected by positioning control surfaces.

42. The method of claim 39, wherein the optical sensor includes a laser.

43. The method of claim 42, wherein the laser includes a laser Doppler velocimeter system.

44. The method of claim 39, wherein the predetermined distance is less than around 1,000 meters.

45. The method of claim 44, wherein the predetermined distance is around 100 feet.

46. The method of claim 39, wherein the aircraft includes an unmanned aircraft.

47. The method of claim 46, wherein the unmanned aircraft includes a rocket propelled vehicle.

48. The method of claim 47, wherein the rocket propelled vehicle includes a missile.

49. The method of claim 46, wherein the unmanned aircraft includes a drone.

50. An aircraft comprising:

a fuselage;

an engine;

control surfaces; and a system for automatically correcting flight path of an aircraft onto a predetermined trajectory, the system including:

a sensor configured to sense speed of air relative to an aircraft at a predetermined distance in front of the aircraft;

a navigation system configured to determine displacement of flight path of the aircraft from a predetermined trajectory; and     a processor coupled to receive the sensed speed of air from the sensor and the displacement of the flight path from the navigation system, the processor including:

a first component configured to determine whether the speed of the air or the predetermined distance is indicative of turbulence; and         a second component configured to automatically generate control signals to correct the flight path of the aircraft from the displacement onto the predetermined trajectory by a time when the aircraft enters the turbulence.

51. The aircraft of claim 50, wherein the second component automatically generates the control signals responsive to the indication of turbulence.

52. The aircraft of claim 51, wherein the second component automatically generates the control signals further responsive to the displacement of the flight path.

53. The aircraft of claim 52, wherein the displacement of the flight path includes a position error component.

54. The aircraft of claim 50, wherein the sensor includes an optical sensor.

55. The aircraft of claim 54, wherein the optical sensor includes a laser.

56. The aircraft of claim 55, wherein the laser includes a laser Doppler velocimeter system.

57. The aircraft of claim 50, wherein the predetermined distance is less than around 1,000 meters.

58. The aircraft of claim 57, wherein the predetermined distance is around 100 feet.

59. The aircraft of claim 50, wherein the aircraft includes an unmanned aircraft.

60. The aircraft of claim 59, wherein the unmanned aircraft includes a rocket propelled vehicle.

61. The aircraft of claim 60, wherein the rocket propelled vehicle includes a missile.

62. The aircraft of claim 59, wherein the unmanned aircraft includes a drone.

* * * * *